(12) United States Patent
Honkonen et al.

(10) Patent No.: US 7,884,708 B2
(45) Date of Patent: Feb. 8, 2011

(54) MONITORING SYSTEM FOR VEHICLE WHEELS AND WIRELESS MEASUREMENT MODULE

(75) Inventors: Jarkko Honkonen, Oulu (FI); Yrjo Jurvansuu, Kempele (FI); Teijo Hilden, Liminka (FI); Toivo Vilmi, Kiviniemi (FI)

(73) Assignee: W-Secure OY, Oulu (FI)

( * ) Notice: Subject to any disclaimer, the term of this patent is extended or adjusted under 35 U.S.C. 154(b) by 280 days.

(21) Appl. No.: 11/988,661

(22) PCT Filed: Jul. 12, 2006

(86) PCT No.: PCT/FI2006/050338
§ 371 (c)(1),
(2), (4) Date: Mar. 25, 2008

(87) PCT Pub. No.: WO2007/006871
PCT Pub. Date: Jan. 18, 2007

(65) Prior Publication Data
US 2009/0040035 A1 Feb. 12, 2009

(30) Foreign Application Priority Data
Jul. 14, 2005 (FI) ................... 20055409

(51) Int. Cl.
*B60C 23/00* (2006.01)
(52) U.S. Cl. ............ 340/444; 73/146.5; 340/442; 340/443
(58) Field of Classification Search ......... 340/442–447; 73/146.2–146.8
See application file for complete search history.

(56) References Cited

U.S. PATENT DOCUMENTS

| 5,541,573 A * | 7/1996 | Jones ................ 340/444 |
| 2002/0059826 A1* | 5/2002 | Ono et al. ............ 73/146.5 |
| 2002/0113692 A1* | 8/2002 | Normann et al. ........ 340/442 |
| 2003/0020604 A1 | 1/2003 | Fischer et al. |
| 2004/0217849 A1 | 11/2004 | Maehara |

FOREIGN PATENT DOCUMENTS

| EP | 1 172 236 A2 | 1/2002 |
| EP | 1 172 237 A2 | 1/2002 |
| EP | 1 188 625 A2 | 3/2002 |
| EP | 1 524 133 A1 | 4/2005 |
| EP | 1 536 392 A1 | 6/2005 |
| JP | 2004-198185 A | 7/2004 |
| JP | 2004-243806 A | 9/2004 |
| WO | WO-02/20287 A1 | 3/2002 |

OTHER PUBLICATIONS

JP 2004-198185A, Machine Generated English Translation, 6 pages.

* cited by examiner

*Primary Examiner*—Brent Swarthout
(74) *Attorney, Agent, or Firm*—Birch, Stewart, Kolasch & Birch, LLP

(57) ABSTRACT

The invention relates to a monitoring system for vehicle wheels and a wireless measurement module. The wireless measurement module is configured to be attached to a vehicle wheel and comprises: an acceleration measurement unit for determining acceleration information associated with wheel motion of the vehicle; a state determination unit for determining a value of at least one parameter characterizing a characteristic or state of the vehicle wheel by using the acceleration information; and a module communication unit for communicating the value of said at least one parameter by means of a wireless communication signal.

14 Claims, 2 Drawing Sheets

MONITORING SYSTEM FOR VEHICLE WHEELS AND WIRELESS MEASUREMENT MODULE

FIELD

The invention relates to a monitoring system for a vehicle wheel and a wireless measurement module.

BACKGROUND

The state of vehicle wheels is a significant factor in traffic safety, wherefore it is important to monitor the state of wheels in order to prevent accidents.

In prior art solutions, the state of vehicle wheels is monitored visually and possibly by using external measuring means.

Drawbacks of the prior art solutions include human errors, such as neglecting of the monitoring or incorrect interpretation of measuring devices. It is thus useful to examine alternative ways of monitoring vehicle wheels.

BRIEF DESCRIPTION

It is an object of the invention to provide a monitoring system for vehicle wheels and a wireless measurement module allowing efficient monitoring of vehicle wheels.

A first aspect of the invention provides a monitoring system for monitoring vehicle wheels, the monitoring system comprising at least one wireless measurement module configured to be attached to a vehicle wheel and comprising: an acceleration measurement unit for determining acceleration information associated with wheel motion of the vehicle; a state determination unit for determining a value of at least one parameter characterizing a characteristic or state of the vehicle wheel by using the acceleration information; and a module communication unit for communicating the value of said at least one parameter by means of a wireless communication signal.

A second aspect of the invention provides a wireless measurement module configured to be attached to a vehicle wheel and comprising: an acceleration measurement unit for determining acceleration information associated with wheel motion of the vehicle; a state determination unit for determining a value of at least one parameter characterizing a characteristic or state of the vehicle wheel by using the acceleration information; and a module communication unit for communicating the value of said at least one parameter by means of a wireless communication signal.

Preferred embodiments of the invention are disclosed in the dependent claims.

The invention is based on the fact that a wireless measurement module attached to a vehicle wheel measures acceleration information associated with wheel motion, on the basis of which the value of a parameter characterizing a characteristic or state of the vehicle wheel is determined. In an embodiment, the parameter may be transmitted via a wireless data transmission connection to a central processing unit where the parameter may be processed.

The monitoring system and wireless measurement module of the invention provide a plurality of advantages. One advantage of the invention allows automatic monitoring of vehicle wheels during driving.

LIST OF FIGURES

Figure 1:
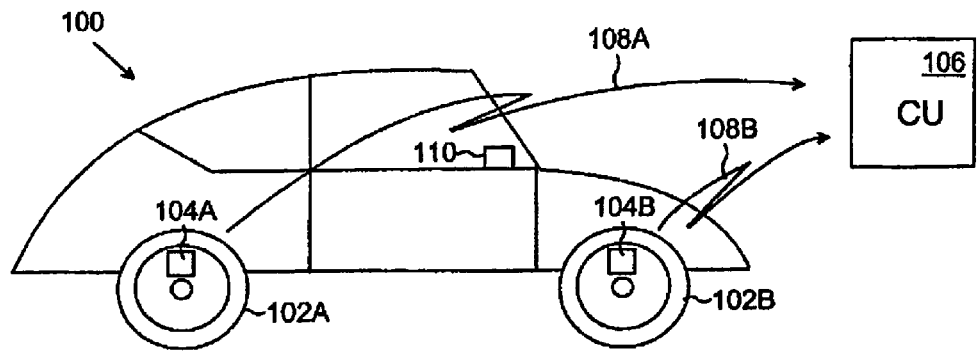
Figure 2:
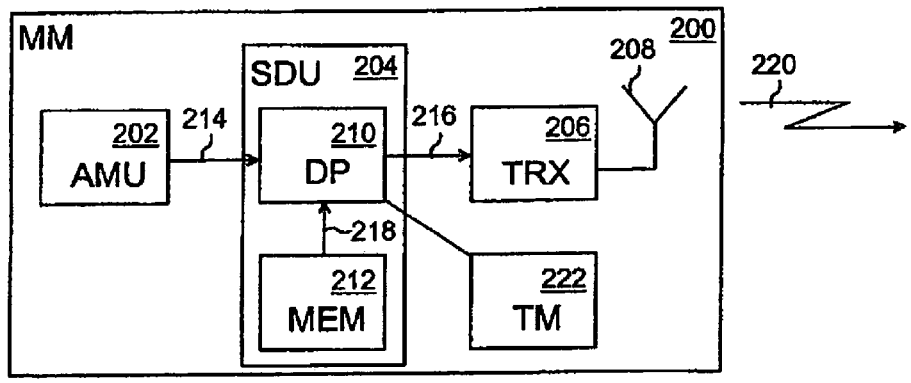
Figure 3:
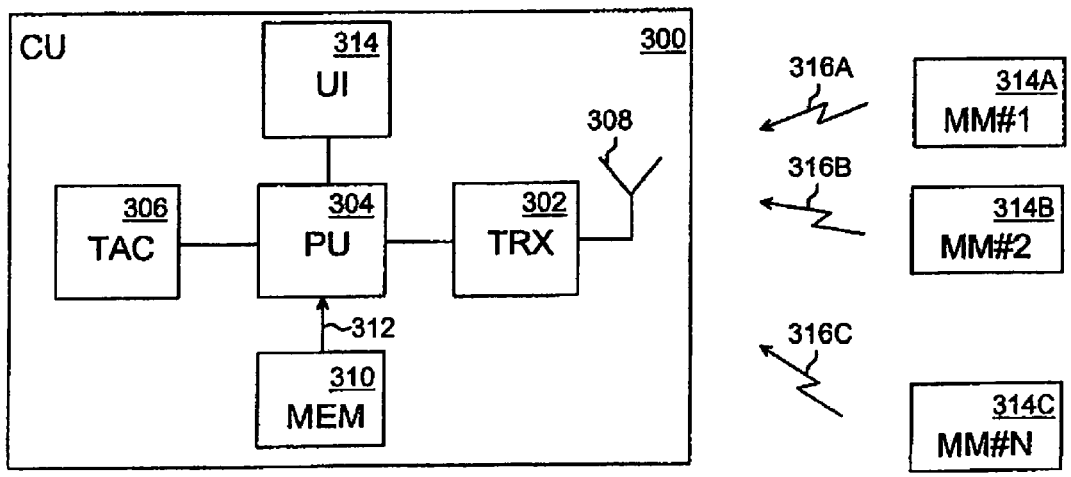
Figure 4:
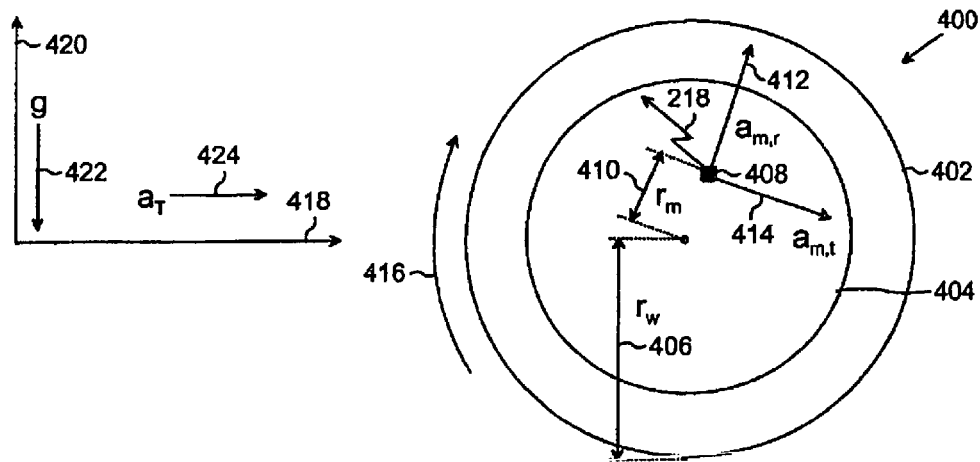
Figure 5:
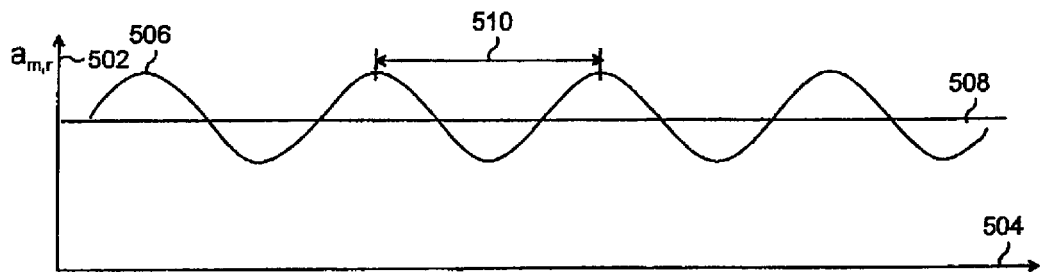
Figure 6:
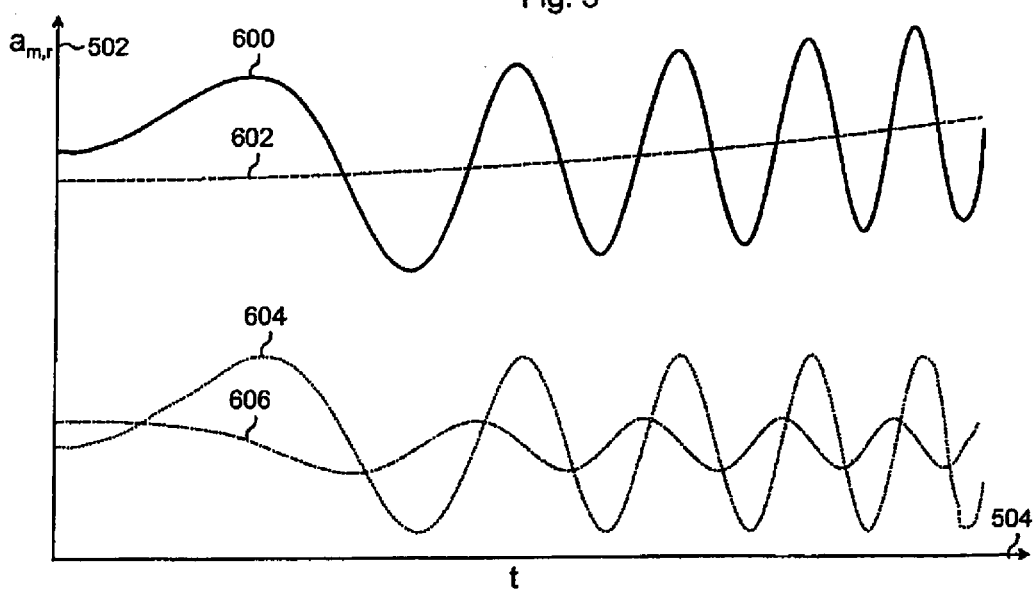

The invention will be described in greater detail with reference to the preferred embodiments and the accompanying drawings, in which FIG. 1 illustrates a first example of the structure of a monitoring system for vehicle wheels, FIG. 2 illustrates an example of the structure of a wireless measurement module, FIG. 3 illustrates an example of the structure of a central processing unit, FIG. 4 illustrates an example of vehicle wheel physics during wheel rotation, FIG. 5 illustrates a first example of acceleration of a vehicle wheel, and FIG. 6 illustrates a second example of acceleration of a vehicle wheel.

DESCRIPTION OF EMBODIMENTS

With reference to FIG. 1, a monitoring system for vehicle wheels comprises wireless measurement modules 104A, 104B to be attached to wheels 102A, 102B of a vehicle 100, the wireless measurement modules 104A, 104B being configured to communicate by means of a wireless communication signal 108A, 108B. In an embodiment, the monitoring system also comprises a central processing unit (CU) 106, which may communicate with the wireless measurement module 104A, 104B by means of the wireless communication signal 108A, 108B.

The vehicle 100 may be a car, lorry, motorcycle and/or trailer. However, the disclosed solution is not restricted to these examples but the vehicle may be any wheeled vehicle, the wheels 102A, 102B of which need to be monitored.

The vehicle wheel 102A, 102B typically comprises a rim and a tyre. A tyre is typically a gas-filled rubber structure.

The central processing unit 106 may be installed in the vehicle 100, in which case the wireless central processing unit 106 may utilize the vehicle 100 structures, such as a user interface and a power source.

In an embodiment, the monitoring system comprises a translational acceleration sensor 110 for measuring translational acceleration of the vehicle 100.

With reference to FIG. 2, a wireless measurement module 200 typically comprises a communication unit (TRX) 206 of the measurement module with antennas 208, a state determination unit (SDU) 204 connected to the communication unit 206 of the measurement module, and an acceleration measurement unit (AMU) 202 connected to the state determination unit 204.

The acceleration measurement unit 202 determines acceleration information 214 associated with the motion of the wheel 102A, 102B in one or more directions. The acceleration information 214 is supplied to the state determination unit 204, which determines the value of a parameter characterizing a state or characteristic of the vehicle wheel 102A, 102B by using the acceleration information 214.

In an embodiment, the parameter characterizes the number of revolutions that the vehicle wheel 102A, 102B has rotated or a variable proportional to the number of revolutions, such as travelling distance.

In an embodiment, the parameter characterizes the radius of the vehicle wheel 102A, 102B or a variable proportional to the radius, such as the diameter of the wheel 102A, 102B or the length of the circumference. The radius of the wheel 102A, 102B or the parameter proportional to the radius can further be used for determining, for instance, the air pressure of the tyre of the wheel 102A, 102B, the amount of tyre tread and/or the load of the wheel 102A, 102B.

In an embodiment, the parameter characterizes an extreme condition of the wheel 102A, 102B, such as stress that exceeds a predetermined limit, which may be caused by the wheel 102A, 102B hitting an object or a roughness on the road surface, for example.

In an embodiment, the parameter characterizes lateral movement of the wheel 102A, 102B, which may result from a faulty bearing and/or breaking of the fastening of the wheel 102A, 102B.

The parameter may be determined by using pre-known reference parameters of the wheel 102A, 102B stored in a memory unit 212 and/or reference parameters determined by the state determination unit 204, such as reference radius, reference temperature, reference pressure and/or reference load of the wheel 102A, 102B.

The state determination unit 204 may be implemented, for instance, by means a computer program 218 executed by a digital processor 210 and stored in the memory unit 212 (MEM).

The digital processor 210 may download the computer program 218 from the memory unit 212, the computer program 218 including encoded instructions for executing a computer process in the digital processor 210. The computer process may execute an algorithm for determining the value of the parameter characterizing the state or characteristic of the vehicle wheel 102A, 102B.

As an element measuring acceleration, the acceleration measurement unit 202 may comprise, for example, an acceleration sensor which is piezoelectric or implemented by other known technology. The structure and function of acceleration sensors are known per se to a person skilled in the art, wherefore they will not be discussed in greater detail herein.

The digital processor 210 supplies the parameter value 216 it has determined to the module communication unit 206, which communicates the parameter value 216 by means of a wireless communication signal 220 to the central processing unit 106, for instance.

The wireless communication signal 220 may be a radio frequency signal, in which case the module communication unit 206 typically comprises a radio transmitter.

In an embodiment, the radio transmitter is based on BlueTooth technology.

In another embodiment, the radio transmitter implements a wireless local area network (WLAN, Wireless Local Access Network) (WPAN, Wireless Personal Area Network), which may be based on the IEEE 802.15.4 protocol, for example. In an embodiment, the radio transmitter implements a ZigBee interface.

In an embodiment, the wireless communication signal 220 is based on the use of a magnetic component of the electromagnetic field. In such a case the antenna 208 may be replaced with an induction coil. The oscillating frequency of the electromagnetic field may be hundreds of kilohertz, for example, but the disclosed solution is not restricted to this frequency range.

In an embodiment, the wireless measurement module 200 comprises a tag memory (TM) 222 for storing the parameter the state determination unit 204 has determined. The tag memory 222 may be implemented, for instance, by means of a memory unit 212 or some other element capable of storing data.

The tag memory 222 may be connected, for instance, by means of the digital processor 210 to the module communication unit 206, whereby data contained in the tag memory 222 may be transferred by means of the wireless communication signal 220 to the central processing unit 106, for example.

The tag memory 222 may also include reference parameter values of the wheel as well as other information on the wheel 102A, 102B, such as the tyre type.

With reference to the example of FIG. 3, a central processing unit 300 comprises an antenna 308, a communication unit (TRX) 302 of the central processing unit, connected to the antenna 308, a processing unit (PU) 304 connected to the communication unit 302 of the central processing unit, a memory unit 310 connected to the processing unit 304, a translational acceleration sensor (TAC) 306 connected to the processing unit 304, and a user interface (UI) 314 connected to the processing unit 304.

The communication unit 302 of the central processing unit may implement a wireless interface based on BlueTooth, WLAN, WPAN, ZigBee or magnetic data transfer, for example.

The communication unit 302 of the central processing unit communicates the wireless communication signal 220 with the wireless measurement module 200 of FIG. 2 by receiving the communication signal 220 via the antenna 308. The communication unit 302 of the central processing unit supplies the parameter included in the wireless communication signal 220 to the processing unit 304.

The processing unit 304 processes the parameter on the basis of encoded instructions 312 stored in the memory unit 310.

In an embodiment, the central processing unit 300 is a computer, in which the communication unit 302 of the central processing unit may be, for example, a network card which implements a BlueTooth connection of a wireless local area network. The computer may be, for example, a portable computer (laptop) or a desktop computer (PC). The computer may be placed in the facilities of a wheel service station, for example; in which case the computer may read data included in the tag memory 222 of the wheel 102A, 102B, such as driving kilometers, the number of revolutions, and/or the parameter value associated with an extreme condition.

In an embodiment, the central processing unit 300 is a mobile phone, a PDA device (Personal Digital Assistant) or another portable electronic device which implements a wireless interface needed to transfer the communication signal 220.

In an embodiment, the central processing unit 300 is a data processing device installed in the vehicle 100. The data processing device may also be connected to a CAN bus (CAN, Controller Area Network) of the vehicle, by which the data processing device may communicate with the vehicle systems.

With reference to the example of FIG. 3, in an embodiment the monitoring system comprises a plurality of wireless measurement modules (MM#1, MM#2, . . . , MM#N) 314A, 314B, 314C, which may have the same structure as the wireless measurement module 200 according to FIG. 2. Each wireless measurement module 314A to 314C is configured to be attached to a different wheel 102A, 102B of the vehicle 100.

Each wireless measurement module 314A to 314C determines acceleration information of the wheel 102A, 102B, determines the value of a parameter characterizing a characteristic or state of the wheel 102A, 102B, includes the parameter value in the wireless communication signal 316A to 316C and transmits the wireless communication signal 316A to 316C to the central processing unit 300.

Each wireless communication signal 316A to 316C may have a measurement module-specific identifier, which may be implemented by means of the frequency or time frame of the wireless communication signal 316A to 316C or by means of the code included in the wireless communication signal 316A to 316C.

The communication unit 302 of the central processing unit receives the wireless communication signals 316A to 316C and supplies the parameters included in the wireless communication signals 316A to 316C to the processing unit 304. The processing unit 304 may compare the parameters received from different wireless measurement modules 314A to 314C and execute a predetermined function if the comparison fulfils predetermined conditions.

In an embodiment, the parameter of each communication signal 316A to 316C characterizes the wheel's 102A, 102B rotational frequency, radius or variable proportional to the radius, such as the diameter or circumference length of the wheel 102A, 102B. The processing unit 304 may compare the parameter values of different wheels 102A, 102B and, in case of detecting a predetermined deviation between the parameters, indicate this deviation to the user by means of the user interface 314 of the central processing unit 300, for instance. A deviation in the rotational frequency of a wheel 102A, 102B from the rotational frequencies of other wheels may be an indication that the air pressure has diminished or the tyre tread has become smaller in the wheel 102A, 102B in question.

In an embodiment, the monitoring system is integrated into the anti-theft system for vehicle wheels, which utilizes acceleration information measured from the vehicle wheels 102A, 102B. In this case, the wireless measurement module 104A, 104B determines, for instance, kinetic state information characterizing the kinetic state of the wheel 102A, 102B on the basis of acceleration measurement, generates a wireless communication signal 108A, 108B on the basis of the kinetic state information and transmits the wireless communication signal 108A, 108B to the central processing unit 106. The central processing unit 106 receives the wireless communication signal 108A, 108B and may execute a predetermined alarm function if the wireless communication signal 108A, 108B fulfils the predetermined conditions.

With reference to FIG. 4, let us examine rotational characteristics of a wheel 400 rotating on a base. The wheel comprises a tyre part 402 and a rim part 404.

In the example of FIG. 4, a wireless measurement module 408 is placed at the distance of a measurement radius 410 from the centre point of the wheel 400. The radius of the wheel 400 is denoted by the reference number 406. The measurement radius 410 affects the measurement range required by the wireless measurement module 408. In the selection of the measurement radius 410, it is reasonable to take into account the maximum rotational speed of the wheel 400 and the dynamic operating range and error margin of the acceleration measurement unit 202. The measurement radius 410 may vary between 5 mm and 10 cm, for instance.

The wireless measurement module 408 is typically attached to the wheel rim, for instance, by means of a capsule embedded in the centre hole of the rim.

FIG. 4 also illustrates a coordinate system provided at the wheel 400, including a radial axis 412, a tangential axis 414 and a lateral axis, the direction of which is perpendicular to the radial axis 412 and the tangential axis 414. In addition, FIG. 4 shows a coordinate system fixed in the space, including a vertical axis 420 and a horizontal axis 418.

In an embodiment, the acceleration measurement unit 202 of the wireless measurement module 408 measures radial acceleration. In this case, the acceleration information 214 includes the radial acceleration.

In an embodiment, the acceleration measurement unit 202 of the wireless measurement module 408 measures tangential acceleration. In this case, the acceleration information 214 includes the tangential acceleration.

In another embodiment, the acceleration measurement unit 202 of the wireless measurement module 408 measures lateral acceleration. In this case, the acceleration information 214 includes the lateral acceleration.

When rotating at a constant speed in the direction of the arrow 416, the wireless measurement module 408 is subjected to centrifugal acceleration in the direction of the radial axis 412 and gravitational acceleration 422 in the direction of the vertical axis 420, in which case the wireless measurement module 408 is subjected to the radial acceleration $$a_{m,r} = -4\pi^2 f^2 r_m + g \sin(4\pi ft + \gamma), \qquad (1)$$

where $a_{m,r}$ is the radial acceleration measured by the wireless measurement module 408, f is the rotational frequency of the wheel 400, $g=9,81$ ms$^{-2}$ is the gravitational acceleration, $r_m$ is the measurement radius 410 and $\gamma$ is the phase factor.

Accordingly, the tangential acceleration may be illustrated by the expression $$a_{m,t} = g \cos(4\pi ft + \gamma). \qquad (2)$$

FIG. 5 illustrates radial acceleration 502 measured by the wireless measurement module 408 as a function of time 504. The curve 506 represents the momentary radial acceleration, and the curve 508 the mean value of the radial acceleration. A similar curve may be provided for tangential acceleration.

The mean value 508 of the radial acceleration may be used for determining the first term of the right side of the equation (1), on the basis of which the rotational frequency f can be determined if the measurement radius $r_m$ is known.

The rotational frequency may also be determined by measuring the cycle time of the curve 506 and calculating the mean value of the cycle time 510.

The rotational frequency may also be determined by measuring the cycle time of the tangential acceleration.

In an embodiment, the state determination unit 204 may register the total number of revolutions N of the wheel 400 by summing the acceleration maximums of the curve 506, for instance. In this case, the distance S that the wheel 400 has travelled may be counted on the basis of the equation $$S = 2\pi r_w \times N, \qquad (3)$$

where $r_w$ is the radius 406 of the wheel 400. The wheel radius 406 may be stored in the tag memory 22, for instance.

In an embodiment, the acceleration measurement unit 408 determines the acceleration rotation component associated with the rotation of the wheel 400, such as radial acceleration $a_{m,r}$ or tangential acceleration $a_{m,t}$. The acceleration measurement unit 408 supplies the value of the acceleration rotation component to the module communication unit 206, which includes the value of the acceleration rotation component in the wireless communication signal 220.

The central processing unit 300 receives the wireless communication signal 220 and supplies the value of the acceleration rotation component to the processing unit 304.

The translational acceleration sensor 306 of the central processing unit 300 may determine the acceleration translation component $a_T$ 424 associated with the translation of the vehicle wheel 102A, 102B and supply the acceleration translation component $a_T$ 424 to the processing unit 304.

The processing unit 304 may determine the value of the parameter characterizing the state or characteristic of the vehicle wheel 102A, 102B by means of the acceleration rotation component and the acceleration translation component.

The radius 406 of the wheel 400 may be determined, for instance, on the basis of the expression $$r_w = v_T \sqrt{\frac{r_m}{a_{m,r}}}, \quad (4)$$

where $v_T$ is the propagation speed of the vehicle 100, which may be calculated as the time integral of the translational acceleration, for example.

With reference to the example of FIG. 6, let us examine the radial acceleration of the vehicle wheel 400 in accelerated motion, measured by the wireless measurement module 408. Thus, the radial acceleration may be presented by the expression $$a_{m,r}(t) = 4\pi^2 f^2(t) r_m + a_T \cos(\alpha(t)) + g \sin(\alpha(t)) \quad (5)$$

where $\alpha(t)$ is the rotational angle of the wheel 400 as a function of time t.

Correspondingly, the tangential acceleration may be presented by the expression $$a_{m,t}(t) = a_T \sin(\alpha(t)) + g \cos(\alpha(t)). \quad (6)$$

The first term of the right side of the equation (5) is marked with a broken line 602 and it represents the centrifugal acceleration in the direction of the radial axis 412, which increases according to the translational acceleration $a_T$.

The second term of the right side of the equation (5) is marked with a dot-and-dash line 606 and it shows the direct effect of the translational acceleration $a_T$ on the radial acceleration.

The third term of the right side of the equation (5) is marked with a dotted line 604 and it represents the effect of gravitation g on the radial acceleration.

A continuous line 600 represents the radial acceleration $a_{m,r}$ of the wireless measurement module 400.

In an embodiment, the state determination unit 204 determines the acceleration translation component on the basis of the radial acceleration by adapting the curve 600 to the model according to the equation (5), for instance. In an embodiment, the state determination unit 204 eliminates the gravitational acceleration mathematically from the curve 600, whereby the effect of the translational acceleration remains as a periodic factor. The translational acceleration may be determined on the basis of the amplitude of the curve 600 after the effect of gravitation has been eliminated. Thus, the radius 406 of the wheel 400 may be determined, for instance, by means of the equation (4) when the propagation speed $v_T$ has been calculated as the time integral of $a_T$, for example. The tangential acceleration may be examined in the similar manner.

Although the invention was described above with reference to the example according to the accompanying drawings, it is clear that the invention is not restricted thereto but may be modified in various ways within the scope of the appended claims.

The invention claimed is:

1. A monitoring system for monitoring vehicle wheels, wherein the monitoring system comprises at least one wireless measurement module configured to be attached to a vehicle wheel and comprising:
   an acceleration measurement unit for determining lateral acceleration information associated with lateral wheel motion of the vehicle;
   a state determination unit for determining a value of at least one parameter characterizing a characteristic or state of the vehicle wheel by using the acceleration information; and
   a module communication unit for communicating the value of said at least one parameter by means of a wireless communication signal,
   wherein the characteristic or state of the vehicle wheel is selected from the group consisting of a faulty bearing and a breaking of a fastening of the wheel.

2. A monitoring system as claimed in claim 1, wherein
   the acceleration measurement unit is configured to measure radial acceleration; and
   the state determination unit is configured to determine the value of said at least one parameter by means of the radial acceleration.

3. A monitoring system as claimed in claim 1, wherein
   the acceleration measurement unit is configured to measure tangential acceleration; and
   the state determination unit is configured to determine the value of said at least one parameter by means of the tangential acceleration.

4. A monitoring system as claimed in claim 1, wherein the wireless measurement module also comprises a wirelessly readable tag memory for storing the value of said at least one parameter.

5. A monitoring system as claimed in claim 1, wherein the monitoring system also comprises a central processing unit comprising:
   a communication unit of the central processing unit for communicating a wireless communication signal with the measurement module; and
   a processing unit for processing said at least one parameter.

6. A monitoring system as claimed in claim 5, wherein the processing unit is configured to execute a predetermined function if the parameter fulfils predetermined conditions.

7. A monitoring system as claimed in claim 5, wherein the monitoring system comprises a plurality of measurement modules, each comprising:
   an acceleration measurement unit for determining acceleration information associated with wheel motion of the vehicle;
   a state determination unit for determining a value of at least one parameter characterizing a characteristic or state of the vehicle wheel by using the acceleration information; and
   a module communication unit for communicating the value of said at least one parameter by means of a wireless communication signal, the communication unit of the central processing unit being configured to receive a plurality of wireless communication signals;
   the processing unit being configured to perform a comparison of the parameters received from different wireless measurement modules; and
   the processing unit being configured to execute a predetermined function if the comparison fulfils predetermined conditions.

8. A monitoring system as claimed in claim 5, wherein the acceleration measurement unit is configured to determine the acceleration rotation component associated with the rotation of the wheel
   the module communication unit is configured to include the acceleration rotation component in the wireless communication signal, and
   the central processing unit also comprises a translational acceleration sensor for determining the acceleration translation component associated with the translation of the vehicle wheel, and the processing unit is configured to determine the value of said at least one parameter by means of the acceleration rotation component and the acceleration translation component.

9. A monitoring system as claimed in claim 1, wherein the monitoring system is integrated into an anti-theft system for vehicle wheels, which utilizes acceleration information measured from the vehicle wheels.

10. A wireless measurement module, wherein the wireless measurement module is configured to be attached to a vehicle wheel, the wireless measurement module comprising:

an acceleration measurement unit for determining lateral acceleration information associated with lateral wheel motion of the vehicle;

a state determination unit for determining a value of at least one parameter characterizing a characteristic or state of the vehicle wheel by using the acceleration information;

and a module communication unit for communicating the value of said at least one parameter by means of a wireless communication signal, wherein the characteristic or state of the vehicle wheel is selected from the group consisting of a faulty bearing and a breaking of a fastening of the wheel.

11. A wireless measurement module as claimed in claim 10, wherein the acceleration measurement unit is configured to measure radial acceleration; and the state determination unit is configured to determine the value of said at least one parameter by means of the radial acceleration.

12. A wireless measurement module as claimed in claim 10, wherein the acceleration measurement unit is configured to measure tangential acceleration; and the state determination unit is configured to determine the value of said at least one parameter by means of the tangential acceleration.

13. A wireless measurement module as claimed in claim 10, wherein the wireless measurement module also comprises a wirelessly readable tag memory for storing the value of said at least one parameter.

14. A wireless measurement module as claimed in claim 10, wherein the wireless measurement module is integrated into an anti-theft system for vehicle wheels, which utilizes acceleration information measured from the vehicle wheels.

* * * * *